(12) United States Patent
Pool et al.

(10) Patent No.: US 11,977,888 B2
(45) Date of Patent: *May 7, 2024

(54) INLINE DATA INSPECTION FOR WORKLOAD SIMPLIFICATION

(71) Applicant: NVIDIA Corporation, Santa Clara, CA (US)

(72) Inventors: Jeffrey Michael Pool, Durham, NC (US); Andrew Kerr, San Francisco, CA (US); John Tran, Denver, CO (US); Ming Y. Siu, Santa Clara, CA (US); Stuart Oberman, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,923

(22) Filed: Feb. 22, 2023

(65) Prior Publication Data
US 2023/0221957 A1 Jul. 13, 2023

Related U.S. Application Data

(63) Continuation of application No. 16/708,261, filed on Dec. 9, 2019, now Pat. No. 11,609,761, which is a
(Continued)

(51) Int. Cl.
*G06F 9/30* (2018.01)
*G06N 20/00* (2019.01)

(52) U.S. Cl.
CPC ........ *G06F 9/30043* (2013.01); *G06F 9/3001* (2013.01); *G06F 9/30021* (2013.01);
(Continued)

(58) Field of Classification Search
CPC .............. G06F 9/30043; G06F 9/3001; G06F 9/30021; G06F 9/30094; G06F 9/30145; G06F 9/30098; G06N 20/00
See application file for complete search history.

(56) References Cited

U.S. PATENT DOCUMENTS 5,377,336 A  12/1994 Eickemeyer et al.
5,751,983 A   5/1998 Abramson et al.
(Continued)

FOREIGN PATENT DOCUMENTS

CN   102053817 A    5/2011
CN   103353834 A   10/2013
(Continued)

OTHER PUBLICATIONS

Chen et al.; Eyeriss: A Spatial Architecture for Energy-Efficient Dataflow for Convolutional Neural Networks; IEEE; 2016 (Year: 2016).*
(Continued)

*Primary Examiner* — Corey S Faherty
(74) *Attorney, Agent, or Firm* — Davis Wright Tremaine LLP

(57) ABSTRACT

A method, computer readable medium, and processor are described herein for inline data inspection by using a decoder to decode a load instruction, including a signal to cause a circuit in a processor to indicate whether data loaded by a load instruction exceeds a threshold value. Moreover, an indication of whether data loaded by a load instruction exceeds a threshold value may be stored.

20 Claims, 11 Drawing Sheets

Related U.S. Application Data continuation of application No. 15/693,345, filed on Aug. 31, 2017, now Pat. No. 10,503,507.

(52) U.S. Cl.
CPC ...... *G06F 9/30094* (2013.01); *G06F 9/30145* (2013.01); *G06F 9/30098* (2013.01); *G06N 20/00* (2019.01)

(56) References Cited

U.S. PATENT DOCUMENTS

| | | | |
|---|---|---|---|
| 6,173,366 | B1 | 1/2001 | Thayer et al. |
| 7,515,761 | B2 | 4/2009 | Takakura et al. |
| 9,182,959 | B2 | 11/2015 | Gonion |
| 9,298,456 | B2 | 3/2016 | Gonion |
| 9,858,073 | B2 * | 1/2018 | Maloney ............. G06F 9/30043 |
| 2004/0193849 | A1 | 9/2004 | Dundas |
| 2004/0205326 | A1 | 10/2004 | Sindagi et al. |
| 2005/0198054 | A1 | 9/2005 | Sankaran |
| 2006/0106986 | A1 | 5/2006 | Bacon et al. |
| 2010/0088257 | A1 | 4/2010 | Lu et al. |
| 2011/0047360 | A1 | 2/2011 | Maloney |
| 2013/0326200 | A1 | 12/2013 | Kleen et al. |
| 2017/0243320 | A1 | 8/2017 | Gruber et al. |
| 2018/0107482 | A1 | 4/2018 | Schlanger et al. |
| 2020/0159529 | A1 * | 5/2020 | Sen ....................... G06F 9/3887 |
| 2021/0326144 | A1 * | 10/2021 | Raha ...................... G06N 3/045 |
| 2023/0102690 | A1 * | 3/2023 | Srikanth ............... G06F 3/0659 |
| | | | 711/154 |

FOREIGN PATENT DOCUMENTS

| | | |
|---|---|---|
| CN | 104272248 A | 1/2015 |
| CN | 105745618 A | 7/2016 |
| EP | 2725483 A2 | 4/2014 |

OTHER PUBLICATIONS

Albericio et al.; Cnvlutin: Ineffectual-Neuron-Free Deep Neural Network Computing; IEEE; 2016 (Year: 2016).*

Bull, "Introduction to Computer Architecture," Mar. 2015, retrieved Feb. 10, 2020, www.archer.ac.uk/training/course-material/2015/03/thread_prog/L 10-comparchitecture.pdf, 77 pages.

Hastie et al., "Statistical Learning with Sparsity: The Lasso and Generalizations," Chapman and Hall/CRC, Monographs on Statistics and Applied Probability Series No. 143, May 7, 2015, 362 pages.

IEEE, "IEEE Standard 754-2008 (Revision of IEEE Standard 754-1985): IEEE Standard for Floating-Point Arithmetic," Aug. 29, 2008, 70 pages.

Office Action for Chinese Application No. 201810980508.0, dated Nov. 2, 2022, 12 pages.

Stallings, "Computer Organization & Architecture," Prentice Hall, 7th edition, 2006, 6 pages.

Wikipedia, "TEST (x86 instruction)," Wikipedia the Free Encyclopedia, https://en.wikipedia.org/wiki/TEST_(x86_instruction), most recent edit May 7, 2019 (retrieved Jul. 24, 2019), 1 page.

www.6502.org, "6502 Compare Instructions," Dec. 1, 2002, retrieved Feb. 10, 2020, www.6502.org/tutorials/compare_instructions.html, 4 pages.

Zhu et al., "Specification Language Design in C Program Exact Shape Analysis," Small Microcomputer Systems, 37(4): 2016, 6 pages.

* cited by examiner

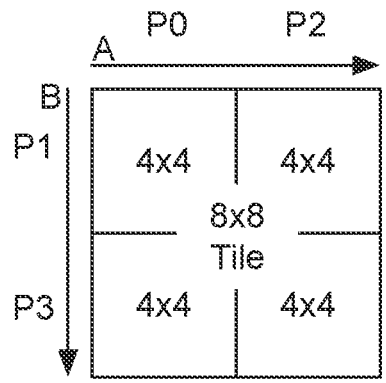

*Fig. 2C*

FLOP3.AND P4, P0, P2, ?W1; // P4 is predicate for A tile dimension, initialize P4=0, predicate = (P0 AND P2 == 0)

FLOP3.AND P5, P1, P3, ?W1; // P5 is predicate for B tile dimension, initialize P4=0, predicate = (P1 AND P3 == 0)

LDS.128 P0, , ?W1; // Read 128 bits (4 values in A) and store in P0

LDS.128 P1, , ?W1; // Read 128 bits (4 values in B) and store in P1

LDS.128 P2, , ?W1; // Read 128 bits (4 values in A) and store in P2

LDS.128 P3, , ?W1; // Read 128 bits (4 values in B) and store in P3

FLOP3.OR P4, P4, P5, ?W1; // Set tile predicate P4 = P4 OR P5

@P4 BRANCH NextK;

Instructions 290

NextK;

*Fig. 2D*

INLINE DATA INSPECTION FOR WORKLOAD SIMPLIFICATION

CROSS-REFERENCE TO RELATED APPLICATIONS

This application is a Continuation of U.S. patent application Ser. No. 16/708,261, filed Dec. 9, 2019, entitled "INLINE DATA INSPECTION FOR WORKLOAD SIMPLIFICATION," which is a Continuation of U.S. patent application Ser. No. 15/693,345, filed Aug. 31, 2017, now U.S. Pat. No. 10,503,507, entitled "INLINE DATA INSPECTION FOR WORKLOAD SIMPLIFICATION," the disclosures of which are incorporated by reference herein in their entirety.

FIELD OF THE INVENTION

The present invention relates to data inspection, and more particularly to data inspection during program instruction execution.

BACKGROUND

For deep learning applications a convolution kernel often operates on data that is sparse, meaning many of the values in the data equal zero. The sparsity can be either in the activations or in the weights. Sparsity in the activations results from rectified linear unit (ReLU) activation functions in a previous layer of the neural network. Sparsity in the weights occurs when the neural network has been pruned to increase accuracy or reduce the model size. Performing arithmetic operations on the elements having zero values is wasteful in terms of processing time and performance because the arithmetic operations do not contribute to the output. There is a need for addressing these issues and/or other issues associated with the prior art.

SUMMARY

A method, computer readable medium, and system are disclosed for inline data inspection. The method includes the steps of receiving, by a load/store unit, a load instruction and obtaining, by an inspection circuit that is coupled to the load/store unit, data specified by the load instruction. Additional steps include determining that the data equals zero and transmitting the data and a predicate signal to the load/store unit, wherein the predicate signal indicates that the data equals zero. Alternative additional steps include computing a predicate value based on a comparison between the data and a threshold value and transmitting the data and the predicate value to the load/store unit, wherein the predicate value is asserted when the data is less than the threshold value and is negated when the data is not less than the threshold value.

BRIEF DESCRIPTION OF THE DRAWINGS

FIG. 2C illustrates a conceptual diagram of an arithmetic operation for a tile of data, in accordance with one embodiment;

FIG. 2D illustrates pseudo-code including an instruction that initiates inline data inspection, in accordance with one embodiment;

DETAILED DESCRIPTION

One solution to avoid performing arithmetic operations on operands (i.e., elements) having a value of zero is to inspect data that has been loaded from memory and will be used as operands for arithmetic operations. However, such an approach necessitates extra instructions to compare values and reduce the results of the comparisons over some number of operands. The number of instruction issue slots that are available to store instructions often also limits the performance of kernel execution, particularly math intensive kernels. Therefore, the extra instructions may harm the performance of the kernel if arithmetic operations are performed and, if the operations are not performed, the achievable performance improvement may be limited by the instruction fetch latency.

An inline data inspection technique eliminates execution of arithmetic operations, such as multiplication, when the input data equals zero. Therefore, in contrast with the prior art, zero detection instructions are not included in the program. In one embodiment, the inline data inspection technique eliminates execution of operations when the input data is less than a threshold value. Therefore, in contrast with the prior art, comparison instructions are not included in the program. As previously explained, because storage for instructions within a processing unit is limited, reducing the instruction footprint for a sequence of instructions is important. No additional instructions are needed to perform the zero detection or the comparisons for the input data.

Figure 1A:
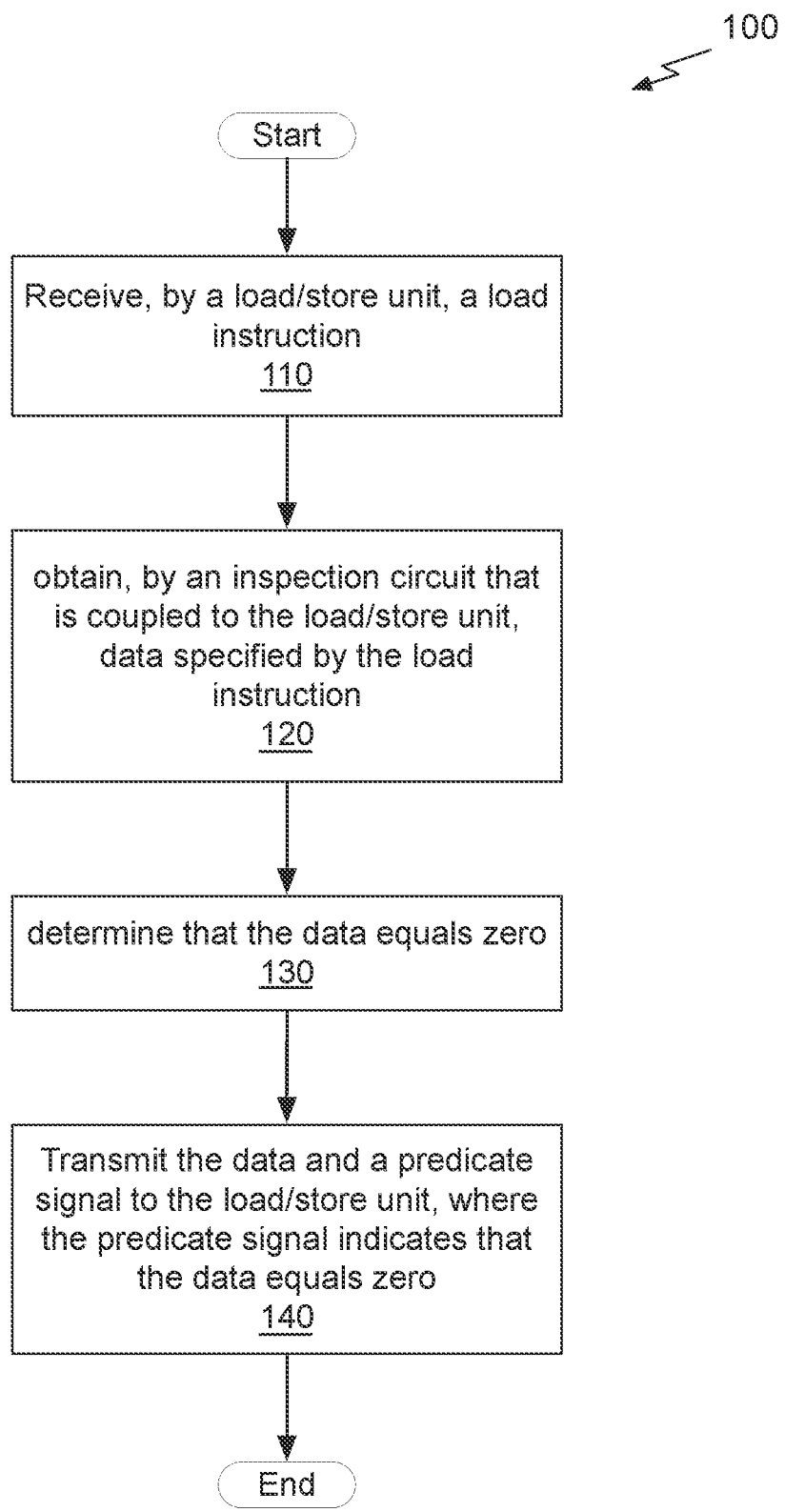
FIG. 1A illustrates a flowchart of a method for inline data inspection, in accordance with one embodiment.

FIG. 1A illustrates a flowchart 100 of a method for inline data inspection, in accordance with one embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), deep learning accelerator (DLA), or any processor capable of executing the program instructions. Furthermore, persons of ordinary skill in the art will understand that any system that performs method 100 is within the scope and spirit of embodiments of the present invention.

At step 110, a load/store unit receives a load instruction. Inline data inspection can be implemented by a variety of instructions, including memory loads (moving data from memory to a cache or register file). It is not necessary for every instruction in an instruction set to support the inline data inspection. In one embodiment, inline data inspection for each instruction is enabled and disabled by the instruction. For example, a field in the instruction may include at least one bit that indicates whether inline data inspection is enabled. In one embodiment, the field may indicate whether inline data inspection is enabled, disabled, or determined at the time of execution.

At step 120, an inspection circuit that is coupled to the load/store unit obtains data specified by the load instruction. In one embodiment, storage and/or transmission circuits within a cache or memory interface may be configured to inspect the data. At step 130, the data is determined to equal zero. In one embodiment, the inspection circuit comprises a zero detection circuit that determines the data equals zero when none of the bits are asserted. In one embodiment, the inspection circuit compares the data with zero to determine whether the data equals zero.

At step 140, the data and a predicate signal are transmitted to the load/store unit, where the predicate signal indicates that the data equals zero. In one embodiment, the data is stored in a destination register and a predicate value that is associated with the destination register is set or cleared according to the predicate signal. In another embodiment, the load/store unit stores the predicate value and discards the data by not storing the data in the destination register. The data may include one or more operands for a subsequent instruction.

A sequence of instructions that implements a math kernel may include the load instruction to compute the predicate value and the predicate value may be provided as an operand to a subsequent branch instruction to control execution of the branch instruction. When the branch instruction is executed, the predicate value may cause a branch to be taken, so that execution of the math kernel instructions is avoided. In other words, the predicate signal may be used to branch over a set of program instructions that perform arithmetic operations, so that the set of program instructions is not executed. In one embodiment, multiply operations are not executed when at least one of the operands (e.g., multiplier or multiplicand) equals zero.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

An example application of the inline data inspection technique is for input data pruning, particularly for deep learning applications having sparse data. Conventional schemes for input data pruning require inclusion of instructions to detect input data having a value equal to zero or less than a threshold value. In contrast with the conventional schemes, when the inline data inspection technique is employed, the detection of zero and less than threshold values is performed automatically when the input data is received in response to execution of a load instruction and before the input data is stored in a register to complete execution of the load instruction. Importantly, additional instructions, specifically explicit zero detection and comparison instructions, are not included in the program to perform the data inspection.

Figure 1B:
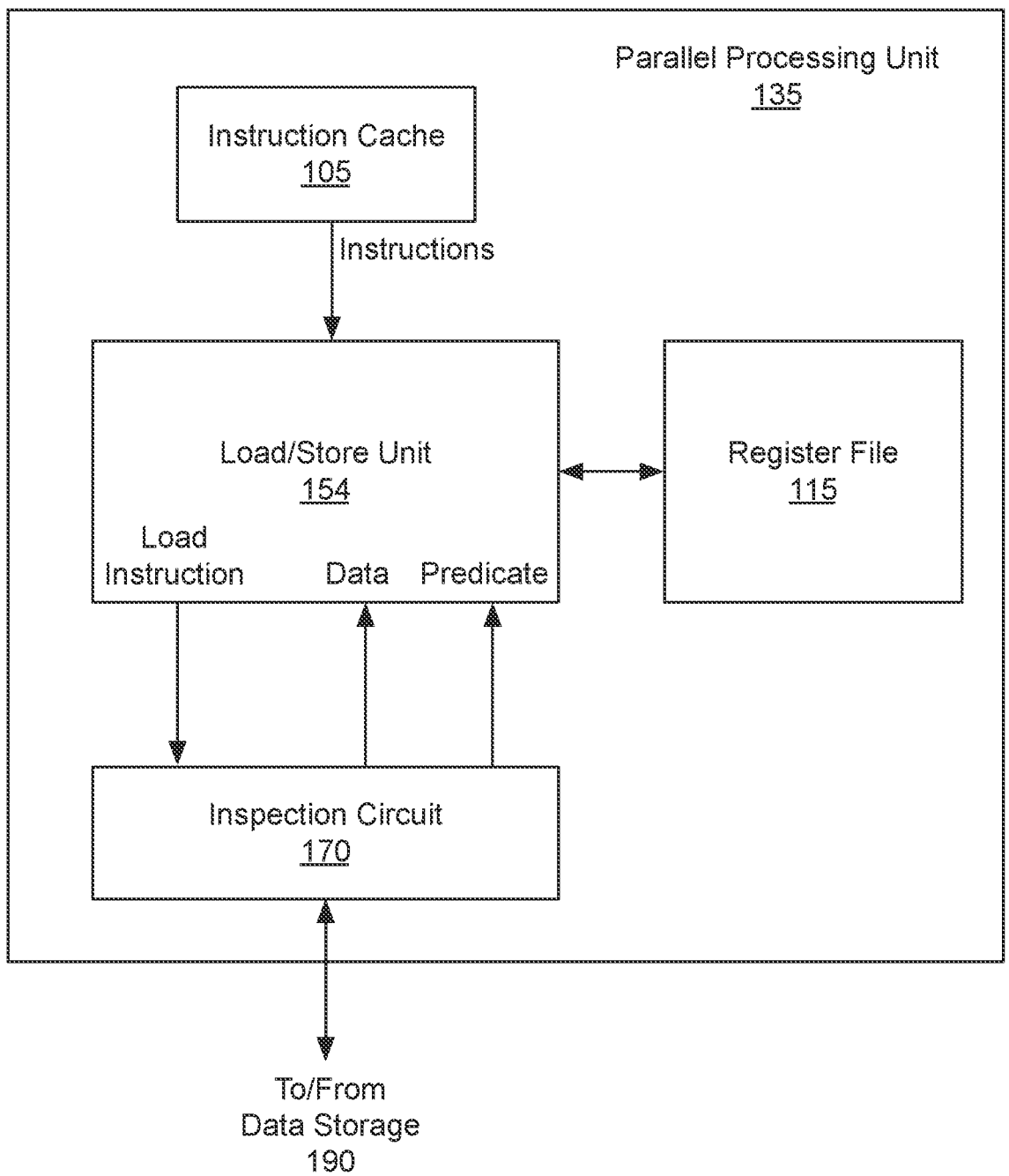
FIG. 1B illustrates a block diagram of inline data inspection logic, in accordance with one embodiment.

FIG. 1B illustrates a block diagram of a parallel processing unit 135 that includes inline data inspection logic, in accordance with one embodiment. The parallel processing unit 135 includes an instruction cache 105, a Load/Store unit 154, a register file 115, and an inspection circuit 170. The instruction cache 105 is configured to fetch and buffer program instructions, thereby reducing latency incurred to read the instructions from memory. In one embodiment, load instructions are output from the instruction cache 105 to the load/store unit 154. The load instructions are decoded by the load/store unit 154 and information is provided to a data storage 190 for reading the data. In one embodiment, the information includes one or more of a read address, a data width, and an enable mask. The data resource 190 may be a cache, register file, addressable memory, random access memory (RAM), buffer, or the like, that receives an address for at least one operand and outputs data for the at least one operand.

The inspection circuit 170 is coupled between the load/store unit 154 and the data storage 190. In one embodiment, the inspection circuit 170 is included within the data storage 190. The inspection circuit 170 receives the data for the at least one operand from the data storage 190 and computes a predicate value. The data may be represented in a floating point format, an integer format, a fixed point format, or the like. The data may include a single operand value or multiple operand values. For example, the data may include 128 bits representing 4 separate 32 bit values and the predicate that is computed for the data is shared between the 4 separate 32 bit values.

In one embodiment, the predicate value is asserted when the data equals zero and is negated when the predicate value does not equal zero. In another embodiment, the predicate value is asserted when the data is less than a threshold value and is negated when the data is not less than the threshold value (i.e., when the data is greater than or equal to the threshold value). In yet another embodiment, the predicate value is asserted when the data is less than or equal to the threshold value and is negated when the data is greater than the threshold value. In one embodiment, the data is encoded in a floating point format and the inspection circuit 170 compares one or more exponents of the data to determine whether the data is less than the threshold value. In one embodiment, the inspection circuit 170 computes statistics associated with a distribution of the data relative to the threshold value and stores the statistics. The statistics may then be used to compute and/or update the threshold value.

The inspection circuit 170 returns the predicate value to the load/store unit 154 via a predicate signal. The inspection circuit 170 also returns the data. The functional unit 250 receives the data for the at least one operand and, in one embodiment, stores the data in the register file 115 at a location specified by the load instruction (e.g., a destination address). Alternatively, the functional unit 250 receives the data for the at least one operand and, discards the data instead of storing the data in the register file 115. The load/store unit 154 may store the predicate value within the load/store unit 154 or in the register file 115.

Inline data inspection may be enabled using two different mechanisms. A first mechanism enables inline data inspection for individual program instructions based on the opcode or an enable field in each instruction. A second mechanism enables and disables inline data inspection by setting and clearing inline data inspection state for a sequence of one or more program instructions. In one embodiment, the inspection circuit 170 outputs the predicate value only when inline data inspection is enabled.

Figure 1C:
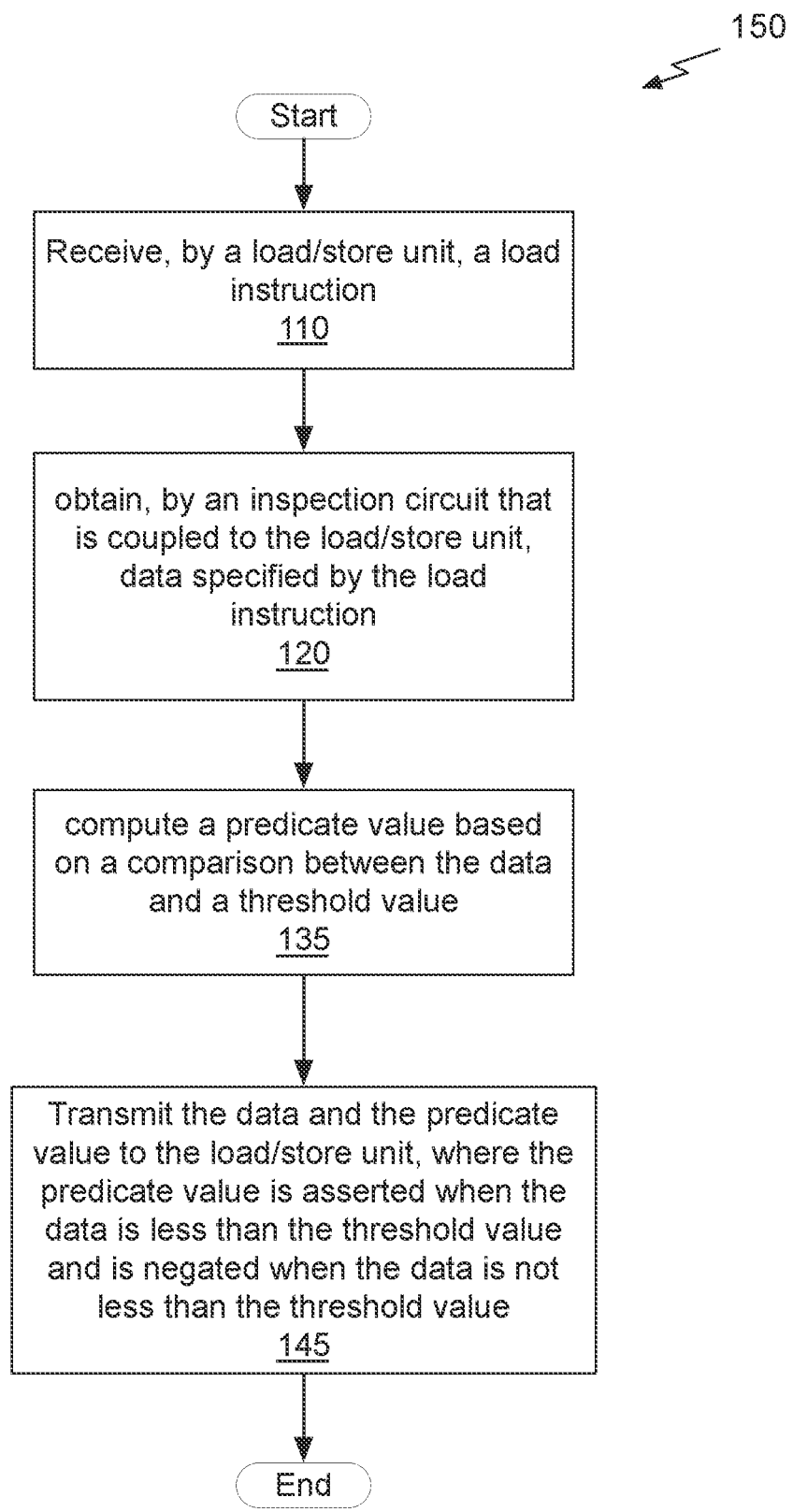
FIG. 1C illustrates another flowchart of a method for inline data inspection, in accordance with one embodiment.

FIG. 1C illustrates another flowchart of a method 150 for inline data inspection, in accordance with one embodiment. Although method 150 is described in the context of a processing unit, the method 150 may also be performed by a program, custom circuitry, or by a combination of custom circuitry and a program. For example, the method 150 may be executed by a GPU, CPU, DLA, or any processor capable of executing the program instructions. Furthermore, persons of ordinary skill in the art will understand that any system that performs method 150 is within the scope and spirit of embodiments of the present invention.

Operations 110 and 120 are completed as previously described in conjunction with FIG. 1A. At step 135, a predicate value is computed based on a comparison between the data and a threshold value. The threshold value may be one of a fixed value or a programmed value. A fixed value may be determined through simulations and then hard-wired into the inspection circuit 170. In one embodiment, a programmable threshold value may be provided with each load instruction. In another embodiment, a programmable threshold value may be stored in a configuration register and can be programmed dynamically by a dedicated program instruction. For example, in the case of a neural network, the threshold value may be determined during the training phase of the neural network. The threshold value may also be computed and/or updated by the program itself during the inference phase of the neural network. In one embodiment, the threshold value is computed to cause a predetermined portion of the data to be less than the threshold value. For example, the threshold value may be computed to cause 10% of the data to be less than the threshold value so that 10% of the data is effectively removed. In another embodiment, the threshold value is computed to cause a predetermined portion of the data to be greater than the threshold value. In yet another embodiment, the threshold value is computed to cause a predetermined portion of the data to be centered around the threshold value.

At step 145, the data and the predicate value are transmitted to the load/store unit 154. In one embodiment, the inspection circuit 170 comprises a comparison circuit that asserts the predicate value when the data is less than the threshold value and negates the predicate value when the data is not less than the threshold value. In one embodiment, the data is stored in a destination register in the register file 115 and a predicate value that is associated with the destination register is set or cleared according to the predicate signal. In another embodiment, the load/store unit stores the predicate value and discards the data by not storing the data in the destination register.

The predicate value may be used to control whether one or more subsequent instructions in the program are executed. Therefore, input data pruning may be performed automatically by the inspection circuit 170 without requiring inclusion of additional instructions, specifically without requiring explicit instructions in a program to perform zero detection or comparison to a threshold value.

Figure 2A:
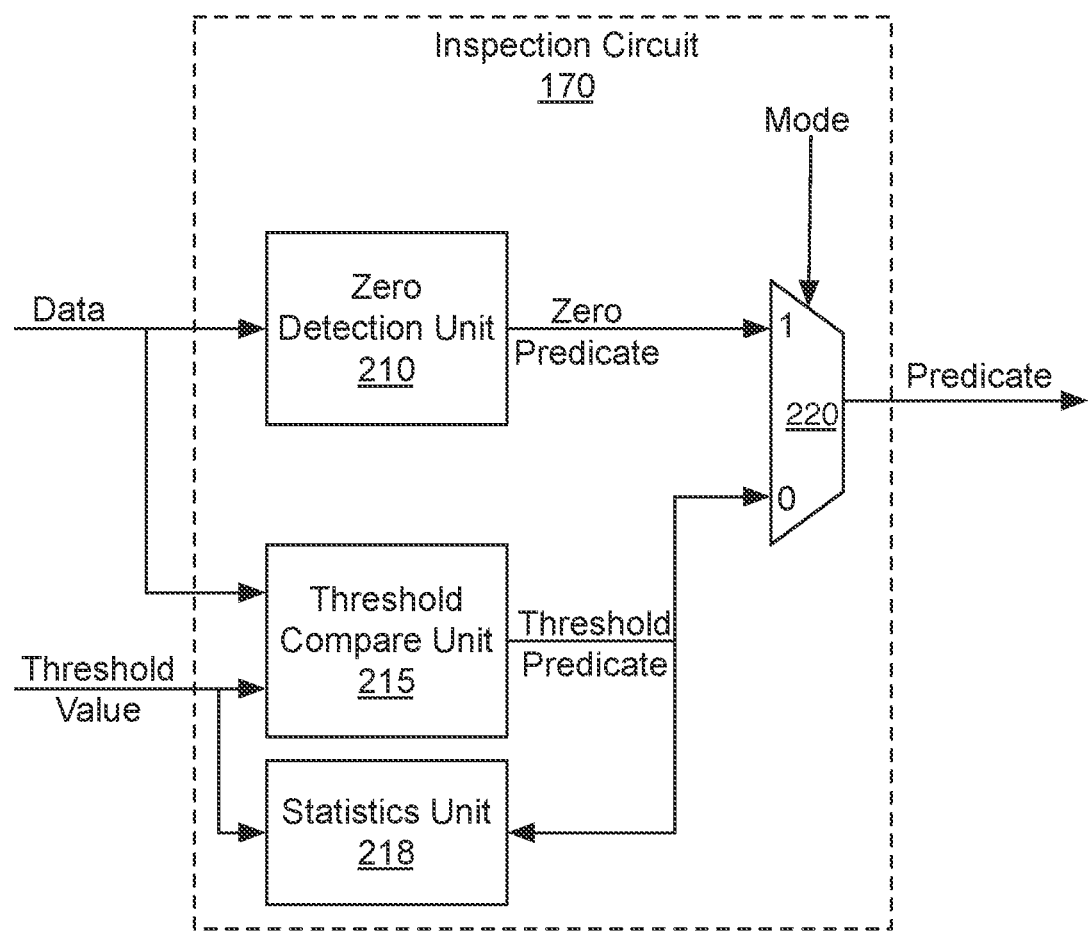
FIG. 2A illustrates a block diagram of the inspection circuit shown in FIG. 1B, in accordance with one embodiment.

FIG. 2A illustrates a block diagram of the inspection circuit 170 shown in FIG. 1B, in accordance with one embodiment. The inspection circuit 170 includes a zero detection unit 210, a threshold compare unit, and a multiplexer 220. The zero detection unit 210 receives the data and determines if the data equals zero. The zero predicate is asserted if the data equals zero and the zero predicate is negated if the data does not equal zero.

The threshold compare unit 215 compares the data to a threshold value and asserts the threshold predicate if the data is less than the threshold value and negates the threshold predicate if the data is not less than the threshold value. The threshold value may be received from the load/store unit 154 along with the data. The threshold value may be fixed, included with the load instruction, or may be provided with a different instruction and stored in a register.

In one embodiment, the data is encoded in a floating point format and the threshold compare unit 215 compares one or more exponents of the data to determine whether the data is less than the threshold value and the one or more mantissa are not considered. For example, the threshold compare unit 215 may determine the data is less than the threshold value when the exponent has zeros in a predetermined number of most significant bit positions.

Based on a mode, the multiplexer 220 selects either the zero predicate or the threshold predicate for output as the predicate. In one embodiment the mode is received from the load/store unit 154 along with the data. The mode may be received from the load/store unit 154 along with the data. The mode may be fixed, included with the load instruction, or may be provided with a different instruction and stored in a register.

In one embodiment, a statistics unit 218 within the inspection circuit 170 computes statistics associated with a distribution of the data relative to the threshold value. The statistics may indicate a portion of the data for which the threshold predicate is asserted and the statistics may be stored in the statistics unit 218. In one embodiment, the statistics are reset by an instruction. Statistics may be gathered for one layer of a neural network and then a threshold value may be computed for a subsequent layer based on the gathered statistics. In one embodiment, statistics may be gathered for a portion of a layer, and the gathered statistics may be used to compute a threshold value for the remaining portions of the layer. In one embodiment, based on the statistics, the statistics unit 218 may determine a threshold value that will cause a predetermined portion of the data to be less than the threshold value. In another embodiment, based on the statistics, the statistics unit 218 may determine a threshold value that will cause a predetermined portion of the data to be greater than the threshold value. In yet another embodiment, based on the statistics, the statistics unit 218 may determine a threshold value that will cause a predetermined portion of the data to be centered around the threshold value.

Figure 2B:
FIG. 2B illustrates fields of an instruction that initiates inline data inspection, in accordance with one embodiment.

FIG. 2B illustrates fields of an instruction 230 that initiates inline data inspection, in accordance with one embodiment. The instruction includes an opcode field 235 and at least a destination register (dst reg) field 250, and a read address field 265. The read address field 265 specifies the location in the data storage where the data is stored. The opcode field 235 specifies the operation performed by the instruction 230. In one embodiment, the operation is a load operation. The dst reg field 250 encodes the location in the register file 115 where the data that is read when the instruction 230 is executed will be stored. In one embodiment, the instruction 230 also includes predicate field 245 so that inline data inspection can be selectively enabled or disabled for when the instruction 230 is executed.

In one embodiment, a width field 240 specifies a width of the data (e.g., 32 bits, 64 bits, 128 bits, and the like). In one embodiment, a mode field 260 specifies whether the inline data inspection detects data equal to zero or data that is less than a threshold value. In one embodiment, when inline data inspection is enabled using a threshold value, the threshold field 255 specifies the threshold value. In one embodiment, an enable field 270 includes an enable mask for the data where each bit in the mask indicates whether one or more bytes or operands in the data may be ignored for computing the predicate.

In one embodiment, different opcodes are specified for a "normal" instruction and an "inline data inspection" version of the same instruction. Providing two different versions of the instruction allows a compiler or programmer to simply replace individual normal instructions with inline data inspection instructions to implement inline data inspection.

FIG. 2C illustrates a conceptual diagram of an arithmetic operation for a tile of data, in accordance with one embodiment. A multiply operation of two vectors A and B, each of including 8 elements may be performed to compute products for an 8×8 tile. Registers P0 and P2 each store 4 elements of A and registers P1 and P3 each store 4 elements of B. If the predicate value is asserted, indicating that the data stored in P0 equals zero or is less than a threshold value, then multiply operations for two of the 4×4 portions within the 8×8 tile may be avoided. Similarly, if one or more predicate values are asserted, indicating that the data stored in P2, P1, and/or P3 equals zero or is less than a threshold value, then multiply operations for two of the 4×4 portions within the 8×8 tile may be avoided. In one embodiment, statistics may be gathered for one or more tiles of a neural network layer and the remaining tiles in the neural network layer may be clamped to the computed threshold value.

FIG. 2D illustrates pseudo-code including instructions that initiate inline data inspection, in accordance with one embodiment. The FLOP3.AND instructions initialize predicate values stored in registers P4 and P5 in the register file 115. Register P4 stores the predicate value for the vector A having elements stored in registers P0 and P2. The value in register P4 is computed as the AND of the predicate values for registers P0 and P2. Register P5 stores the predicate value for the vector B having elements stored in registers P1 and P3. The value in register P5 is computed as the AND of the predicate values for registers P1 and P3.

The LDS.128 instructions are load instructions for 128 bits data. When executed by the load/store unit 154, the four load instructions read data from the data storage 190 and load the data into the registers P0, P1, P2, and P3 in the register file 115. When the four load instructions are received by the inspection circuit 170, the corresponding predicate values are computed for the data to be stored in the registers P0, P1, P2, and P3. The FLOP3.OR instruction computes a tile predicate value by ORing the predicate value for vector A (stored in register P4) and the predicate value for vector B (stored in register P5). The tile predicate value is stored into register P4.

The BRANCH instruction is conditionally executed based on the tile predicate value stored in register P4. When the tile predicate value is asserted, the branch to the label NextK is taken and the instructions 290 are not executed. Therefore, with at least one of the vectors A and B has a predicate value that is asserted, the branch is taken and the instructions 290 are not executed. In one embodiment, the instructions 290 include one or more instructions following the branch instruction and that perform arithmetic operations using vectors A and/or B as input operands. Performing the inline data inspection to compute predicate values for the operands enables conditional execution of the instructions 290. Avoiding execution of instructions that perform unnecessary arithmetic operations improves processing performance and reduces power consumption. Importantly, no additional instructions are included in the program to perform the inline data inspection and no additional instructions stored in the instruction cache 105 to perform the inline data inspection.

Parallel Processing Architecture

Figure 3:
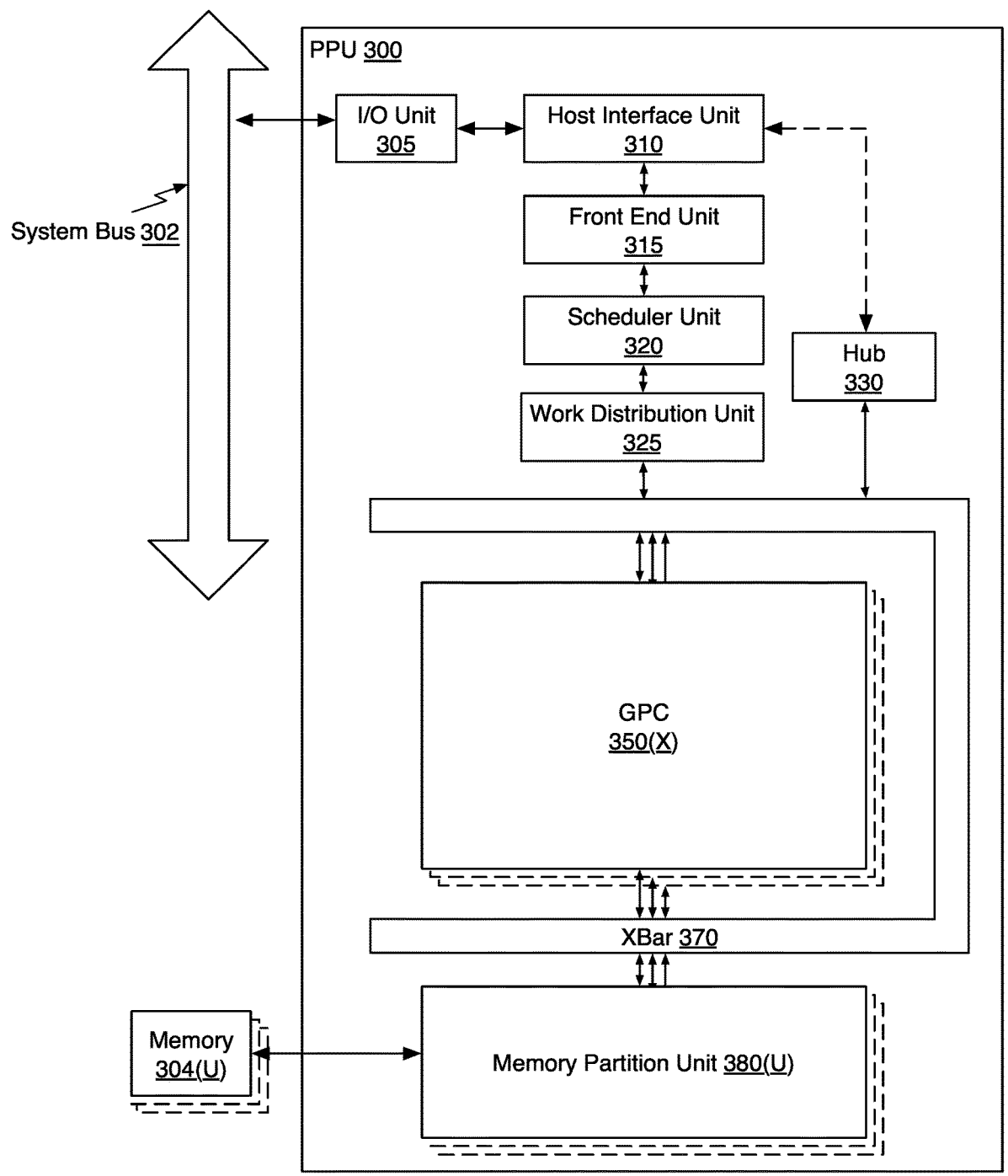
FIG. 3 illustrates a parallel processing unit, in accordance with one embodiment.

FIG. 3 illustrates a parallel processing unit (PPU) 300, in accordance with one embodiment. The PPU 300 may be configured to implement inline data inspection when instructions are executed. In one embodiment, the PPU 300 includes one or inspection circuits 170.

In one embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 3, the PPU 300 includes an Input/Output (I/O) unit 305, a host interface unit 310, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other peripheral devices via a system bus 302. The PPU 300 may also be connected to a local memory comprising a number of memory devices 304. In one embodiment, the local memory may comprise a number of dynamic random access memory (DRAM) devices.

The I/O unit 305 is configured to transmit and receive communications (i.e., commands, data, etc.) from a host processor (not shown) over the system bus 302. The I/O unit 305 may communicate with the host processor directly via the system bus 302 or through one or more intermediate devices such as a memory bridge. In one embodiment, the I/O unit 305 implements a Peripheral Component Interconnect Express (PCIe) interface for communications over a PCIe bus. In alternative embodiments, the I/O unit 305 may implement other types of well-known interfaces for communicating with external devices.

The I/O unit 305 is coupled to a host interface unit 310 that decodes packets received via the system bus 302. In one embodiment, the packets represent commands configured to cause the PPU 300 to perform various operations. The host interface unit 310 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the host interface unit 310 is configured to route communications between and among the various logical units of the PPU 300.

In one embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the host interface unit 310 may be configured to access the buffer in a system memory connected to the system bus 302 via memory requests transmitted over the system bus 302 by the I/O unit 305. In one embodiment, the host processor writes the command stream to the buffer and then transmits a pointer to the start of the command stream to the PPU 300. The host interface unit 310 provides the front end unit 315 with pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 are coupled to the host interface unit 310. The other units may also be connected to the XBar 370 via a hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. In one embodiment, the PPU 300 includes a number U of partition units 380 that is equal to the number of separate and distinct memory devices 304 coupled to the PPU 300. A partition unit 380 will be described in more detail below in conjunction with FIG. 4B.

In one embodiment, a host processor executes a driver kernel that implements an application programming interface (API) that enables one or more applications executing on the host processor to schedule operations for execution on the PPU 300. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 4A:
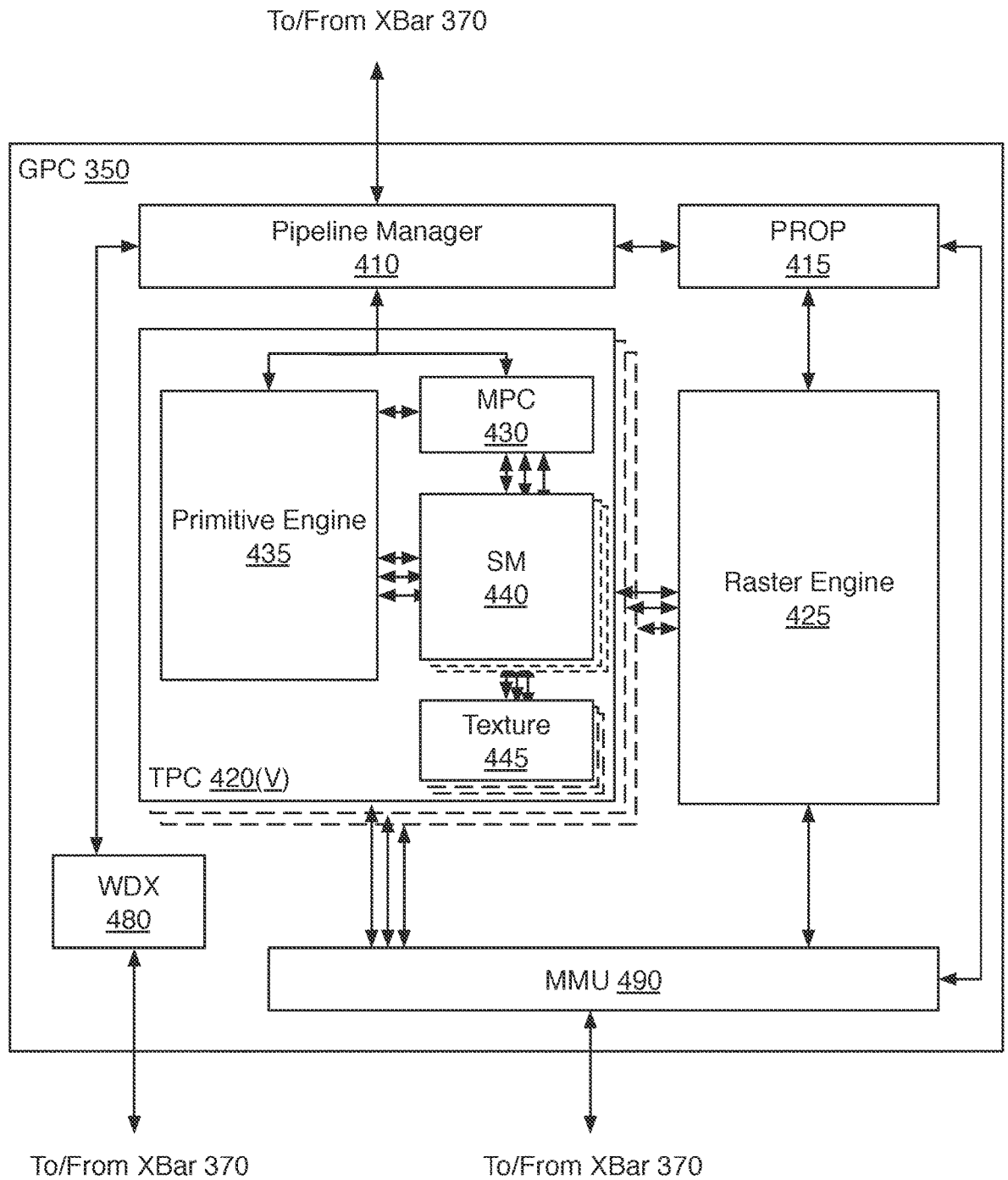
FIG. 4A illustrates a general processing cluster within the parallel processing unit of FIG. 3, in accordance with one embodiment.

FIG. 4A illustrates a GPC 350 within the PPU 300 of FIG. 3, in accordance with one embodiment. As shown in FIG. 4A, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Texture Processing Clusters (TPCs) 420. It will be appreciated that the GPC 350 of FIG. 4A may include other hardware units in lieu of or in addition to the units shown in FIG. 4A.

In one embodiment, the operation of the GPC 350 is controlled by the pipeline manager 410. The pipeline manager 410 manages the configuration of the one or more TPCs 420 for processing tasks allocated to the GPC 350. In one embodiment, the pipeline manager 410 may configure at least one of the one or more TPCs 420 to implement at least a portion of a graphics rendering pipeline. For example, a TPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the TPCs 420 for processing by the primitive engine 435 or the SM 440.

The PROP unit 415 is configured to route data generated by the raster engine 425 and the TPCs 420 to a Raster Operations (ROP) unit in the partition unit 380, described in more detail below. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may be transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 425 comprises fragments to be processed, for example, by a fragment shader implemented within a TPC 420.

Each TPC 420 included in the GPC 350 includes an M-Pipe Controller (MPC) 430, a primitive engine 435, one or more SMs 440, and one or more texture units 445. The MPC 430 controls the operation of the TPC 420, routing packets received from the pipeline manager 410 to the appropriate units in the TPC 420. For example, packets associated with a vertex may be routed to the primitive engine 435, which is configured to fetch vertex attributes associated with the vertex from the memory 304. In contrast, packets associated with a shader program may be transmitted to the SM 440.

In one embodiment, the texture units 445 are configured to load texture maps (e.g., a 2D array of texels) from the memory 304 and sample the texture maps to produce sampled texture values for use in shader programs executed by the SM 440. The texture units 445 implement texture operations such as filtering operations using mip-maps (i.e., texture maps of varying levels of detail). The texture unit 445 is also used as the Load/Store path for SM 440 to MMU 490. In one embodiment, each TPC 420 includes two (2) texture units 445.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 440 is described in more detail below in conjunction with FIG. 5.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for performing translation of virtual addresses into physical addresses in the memory 304.

Figure 4B:
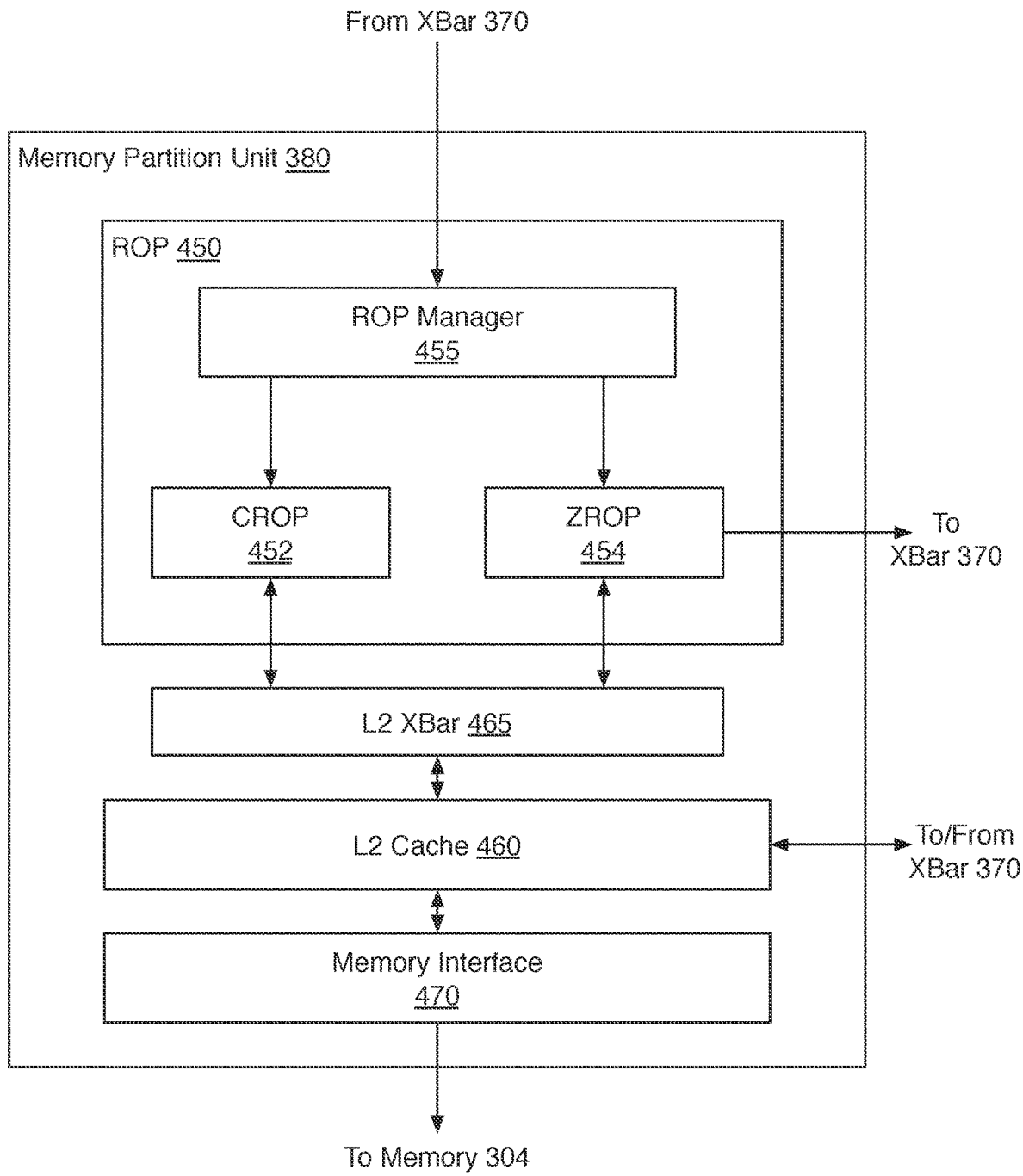
FIG. 4B illustrates a memory partition unit of the parallel processing unit of FIG. 3, in accordance with one embodiment.

FIG. 4B illustrates a memory partition unit 380 of the PPU 300 of FIG. 3, in accordance with one embodiment. As shown in FIG. 4B, the memory partition unit 380 includes a Raster Operations (ROP) unit 450, a level two (L2) cache 460, a memory interface 470, and an L2 crossbar (XBar) 465. The memory interface 470 is coupled to the memory 304. Memory interface 470 may implement 16, 32, 64, 128-bit data buses, or the like, for high-speed data transfer. In one embodiment, the PPU 300 incorporates U memory interfaces 470, one memory interface 470 per partition unit 380, where each partition unit 380 is connected to a corresponding memory device 304. For example, PPU 300 may be connected to up to U memory devices 304, such as graphics double-data-rate, version 5, synchronous dynamic random access memory (GDDR5 SDRAM). In one embodiment, the memory interface 470 implements a DRAM interface and U is equal to 8.

In one embodiment, the PPU 300 implements a multi-level memory hierarchy. The memory 304 is located off-chip in SDRAM coupled to the PPU 300. Data from the memory 304 may be fetched and stored in the L2 cache 460, which is located on-chip and is shared between the various GPCs 350. As shown, each partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 includes a ROP Manager 455, a Color ROP (CROP) unit 452, and a Z ROP (ZROP) unit 454. The CROP unit 452 performs raster operations related to pixel color, such as color compression, pixel blending, and the like. The ZROP unit 454 implements depth testing in conjunction with the raster engine 425. The ZROP unit 454 receives a depth for a sample location associated with a pixel fragment from the culling engine of the raster engine 425. The ZROP unit 454 tests the depth against a corresponding depth in a depth buffer for a sample location associated with the fragment. If the fragment passes the depth test for the sample location, then the ZROP unit 454 updates the depth buffer and transmits a result of the depth test to the raster engine 425. The ROP Manager 455 controls the operation of the ROP unit 450. It will be appreciated that the number of partition units 380 may be different than the number of GPCs 350 and, therefore, each ROP unit 450 may be coupled to each of the GPCs 350. Therefore, the ROP Manager 455 tracks packets received from the different GPCs 350 and determines which GPC 350 that a result generated by the ROP unit 450 is routed to. The CROP unit 452 and the ZROP unit 454 are coupled to the L2 cache 460 via an L2 XBar 465.

Figure 5:
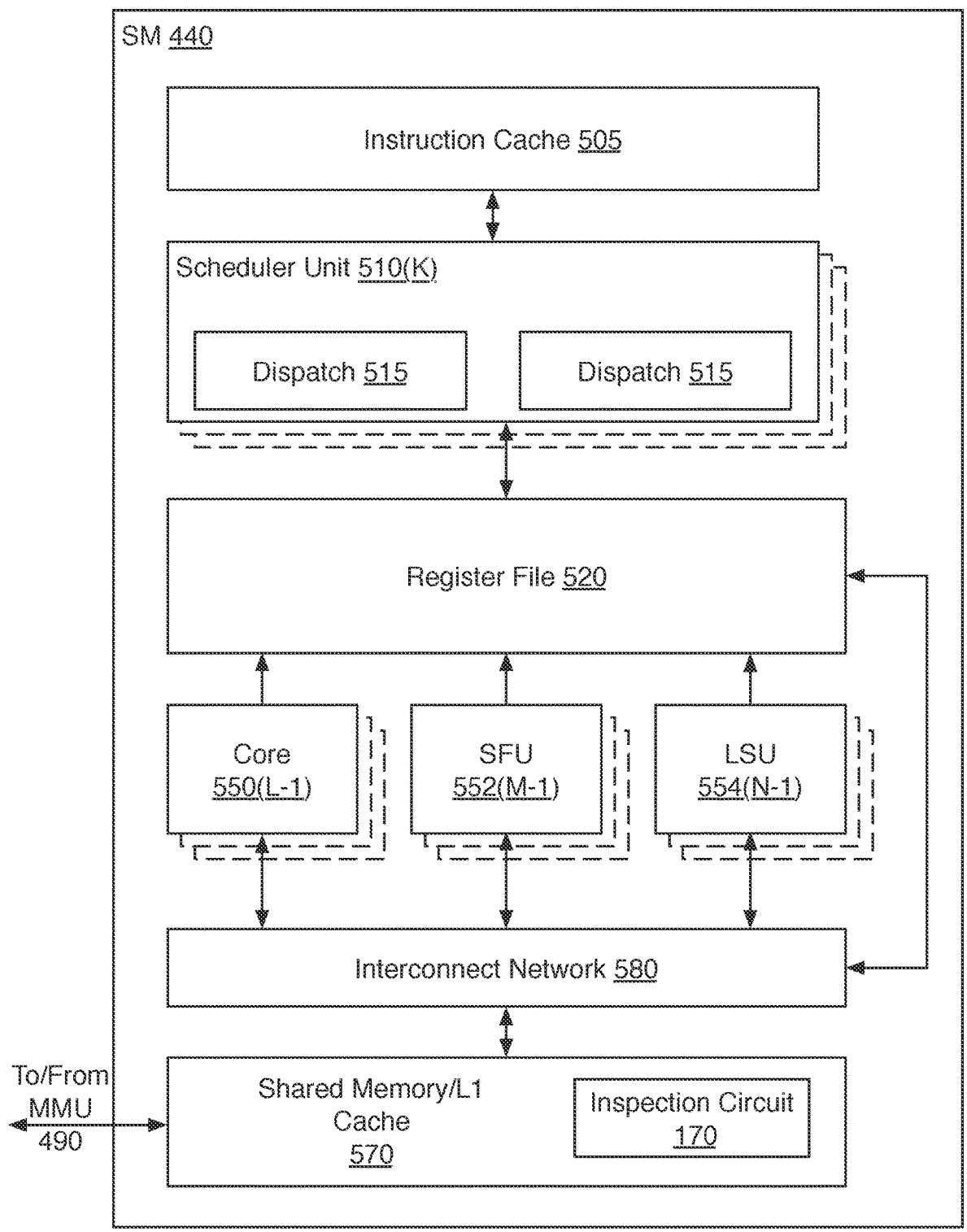
FIG. 5 illustrates the streaming multi-processor of FIG. 4A, in accordance with one embodiment.

FIG. 5 illustrates the streaming multi-processor 440 of FIG. 4A, in accordance with one embodiment. As shown in FIG. 5, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570. In one embodiment, the instruction cache 105, the load/store unit 154, and the register file 115, shown in FIG. 1B is the instruction cache 505, the load/store unit (LSU) 554, and the register file 520, respectively.

As described above, the work distribution unit 325 dispatches tasks for execution on the GPCs 350 of the PPU 300. The tasks are allocated to a particular TPC 420 within a GPC 350 and, if the task is associated with a shader program, the task may be allocated to an SM 440. The scheduler unit 510 receives the tasks from the work distribution unit 325 and manages instruction scheduling for one or more groups of threads (i.e., warps) assigned to the SM 440. The scheduler unit 510 schedules threads for execution in groups of parallel threads, where each group is called a warp. In one embodiment, each warp includes 32 threads. The scheduler unit 510 may manage a plurality of different warps, scheduling the warps for execution and then dispatching instructions from the plurality of different warps to the various functional units (i.e., cores 550, SFUs 552, and LSUs 554) during each clock cycle.

Each dispatch unit 515 is configured to transmit instructions to one or more of the functional units. In the embodiment shown in FIG. 5, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision processing unit that includes a floating point arithmetic logic unit and an integer arithmetic logic unit. The core 550 may also include a double-precision processing unit including a floating point arithmetic logic unit. In one embodiment, the floating point arithmetic logic units implement the IEEE 754-2008 standard for floating point arithmetic. Each SM 440 also comprises M SFUs 552 that perform special functions (e.g., attribute evaluation, reciprocal square root, and the like), and N LSUs 554 that implement load and store operations between the shared memory/L1 cache 570 and the register file 520. In one embodiment, the SM 440 includes 128 cores 550, 32 SFUs 552, and 32 LSUs 554.

Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 64 KB of storage capacity and is in the path from the SM 440 to the partition unit 380. The shared memory/L1 cache 570 can be used to cache reads and writes. In one embodiment, the shared memory/L1 cache 570 includes the inspection circuit 170 to perform inline data inspection for load operations. In one embodiment, at least one inspection circuit 170 is positioned between the shared memory/L1 cache 570 and the LSUs 554.

The PPU 300 described above may be configured to perform highly parallel computations much faster than conventional CPUs. Parallel computing has advantages in graphics processing, data compression, neural networks, deep learning, biometrics, stream processing algorithms, and the like.

When configured for general purpose parallel computation, a simpler configuration can be used. In this model, as shown in FIG. 3, fixed function graphics processing units are bypassed, creating a much simpler programming model. In this configuration, the work distribution unit 325 assigns and distributes blocks of threads directly to the TPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write Global memory through partition shared memory/L1 cache 570 and partition unit 380. When configured for general purpose parallel computation, the SM 440 can also write commands that scheduler unit 320 can use to launch new work on the TPCs 420.

In one embodiment, the PPU 300 comprises a deep learning or machine learning processor. The PPU 300 is configured to receive commands that specify programs for modeling neural networks and processing data according to a neural network.

In one embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In one embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 300 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 300 is embodied on a single semiconductor substrate. In another embodiment, the PPU 300 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 300 may be included on a graphics card that includes one or more memory devices 304 such as GDDR5 SDRAM. The graphics card may be configured to interface with a PCIe slot on a motherboard of a desktop computer that includes, e.g., a northbridge chipset and a southbridge chipset. In yet another embodiment, the PPU 300 may be an integrated graphics processing unit (iGPU) included in the chipset (i.e., Northbridge) of the motherboard.

Various programs may be executed within the PPU 300 in order to implement the various layers of a neural network. For example, the device driver may launch a kernel on the PPU 300 to implement the neural network on one SM 440 (or multiple SMs 440). The device driver (or the initial kernel executed by the PPU 300) may also launch other kernels on the PPU 300 to perform other layers of the neural network. In addition, some of the layers of the neural network may be implemented on fixed unit hardware implemented within the PPU 300. It will be appreciated that results from one kernel may be processed by one or more intervening fixed function hardware units before being processed by a subsequent kernel on an SM 440.

Exemplary System

Figure 6:
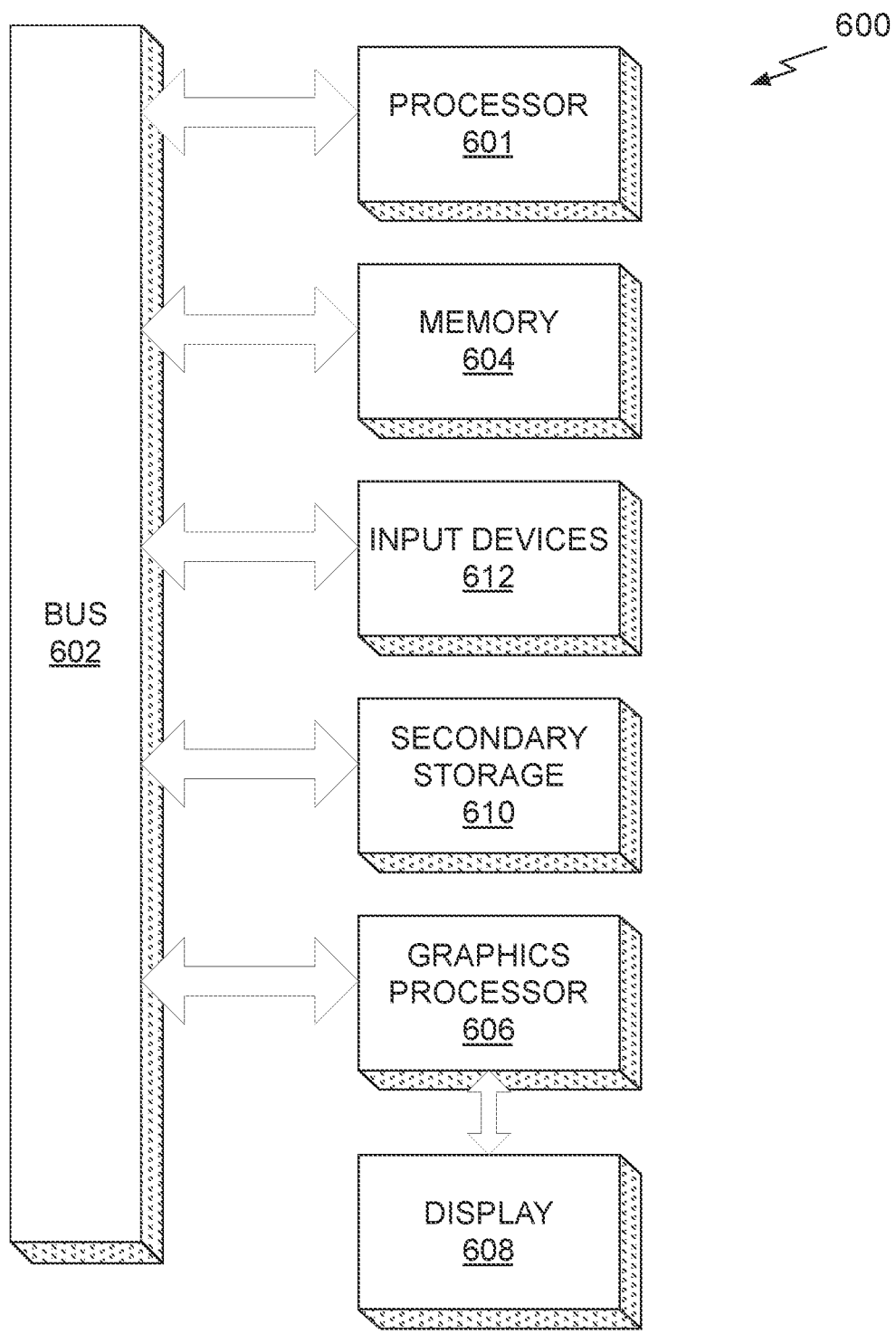
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. The exemplary system 600 may be configured to support inline data inspection.

As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). In one embodiment, the communication bus 602 is the system bus 302 shown in FIG. 3. The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A processor, comprising:
 a load/store circuit to load stored data indicated by a load instruction; and
 an inspection circuit to indicate to the load/store circuit whether the stored data to be loaded by the load instruction exceeds a threshold value.

2. The processor of claim 1, wherein the inspection circuit transmits, based on a comparison of the stored data to be loaded by the load instruction and the threshold value, the stored data and a predicate signal indicating a value of the stored data to the load/store circuit.

3. The processor of claim 1, wherein:
 the inspection circuit asserts a predicate signal based, at least in part on, a comparison between the stored data and the threshold value; and the inspection circuit transmits the asserted predicate signal to the load/store circuit.

4. The processor of claim 1, wherein the load/store circuit discards the stored data based, at least in part, on a predicate signal received from the inspection circuit.

5. The processor of claim 1, wherein the load/store circuit determines whether one or more instructions are to be executed by the processor based, at least in part, on a predicate signal indicating a value of the stored data obtained by the inspection circuit.

6. The processor of claim 1, wherein the inspection circuit compares the stored data with the threshold value based, at least in part, on a decoded load instruction.

7. The processor of claim 1, wherein:
the inspection circuit generates information associated with a distribution of the stored data relative to the threshold value; and
the inspection circuit generates the threshold value based, at least in part, on the information.

8. A method, comprising:
loading, by a load/store circuit, stored data indicated by a load instruction; and
indicating, by using an inspection circuit, to the load/store circuit whether the stored data to be loaded by the load instruction exceeds a threshold value.

9. The method of claim 8, further comprising transmitting, by the inspection circuit, a predicate signal to the load/store circuit based, at least in part, on a comparison of the stored data to be loaded by the load instruction and the threshold value.

10. The method of claim 8, wherein:
the inspection circuit computes a predicate value based, at least in part, on a comparison between the stored data and the threshold value; and
the inspection circuit transmits the predicate value to the load/store circuit.

11. The method of claim 8, wherein the load/store circuit does not store the stored data in a destination register based, at least in part, on a predicate signal received from the inspection circuit.

12. The method of claim 8, wherein:
the stored data is stored in a destination register; and
the load/store circuit sets a predicate value associated with the destination register based, at least in part, on a predicate signal received from the inspection circuit.

13. The method of claim 8, wherein the load/store circuit decodes the load instruction to generate a decoded load instruction that, when executed by the inspection circuit, compares the stored data with the threshold value.

14. The method of claim 8, wherein:
the inspection circuit generates statistics associated with a distribution of the stored data relative to the threshold value; and
the inspection circuit updates the threshold value based, at least in part, on the statistics.

15. A non-transitory machine-readable medium having stored thereon an instruction, which as a result of being performed by a processor, causes the processor to at least:
cause a load/store circuit to load stored data indicated by a load instruction; and
cause an inspection circuit to indicate to the load/store circuit whether the stored data to be loaded by the load instruction exceeds a threshold value.

16. The non-transitory machine-readable medium of claim 15, wherein the processor is further to cause the inspection circuit to transmit, based on a comparison of the stored data to be loaded by the load instruction and the threshold value, a predicate signal to the load/store circuit.

17. The non-transitory machine-readable medium of claim 15, wherein the processor causes the inspection circuit to assert a predicate signal when the comparison between the stored data and the threshold value indicates a first comparison result, and is negated when the comparison between the stored data and the threshold value indicates a second comparison result different from the first comparison result.

18. The non-transitory machine-readable medium of claim 15, wherein the stored data comprises one or more operands of one or more instructions to be executed by the processor.

19. The non-transitory machine-readable medium of claim 15, wherein:
the stored data is stored in a destination register; and
the processor cause the load/store circuit to clear a predicate value associated with the destination register based, at least in part, on a predicate signal obtained by the inspection circuit.

20. The non-transitory machine-readable medium of claim 15, wherein the processor causes the load/store circuit to decode the load instruction and the inspection circuit executes the decoded load instruction to compare the stored data with the threshold value.

* * * * *